(12) United States Patent
Short

(10) Patent No.: US 10,632,594 B2
(45) Date of Patent: Apr. 28, 2020

(54) CLAMP COUPLER FOR WORK LINES

(71) Applicant: Deere & Company, Moline, IL (US)

(72) Inventor: Daniel T. Short, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 74 days.

(21) Appl. No.: 15/460,896

(22) Filed: Mar. 16, 2017

(65) Prior Publication Data

US 2018/0264630 A1    Sep. 20, 2018

(51) Int. Cl.

| | |
|---|---|
| *F16L 3/18* | (2006.01) |
| *B25B 5/14* | (2006.01) |
| *F16L 3/10* | (2006.01) |
| *F16L 3/20* | (2006.01) |
| *F16L 3/22* | (2006.01) |

(Continued)

(52) U.S. Cl.
CPC .............. *B25B 5/14* (2013.01); *F16L 3/1091* (2013.01); *F16L 3/16* (2013.01); *F16L 3/18* (2013.01); *F16L 3/20* (2013.01); *F16L 3/221* (2013.01); *E02F 9/2275* (2013.01)

(58) Field of Classification Search
USPC ........ 248/288.31, 65, 68.1, 69, 70, 74.1, 82; 403/192, 194, 196, 223, 225, 365, 372, 403/289, 290
See application file for complete search history.

(56) References Cited

U.S. PATENT DOCUMENTS 2,355,742 A * 8/1944 Morehouse ........... F16L 3/2235
248/68.1
4,006,874 A    2/1977 McGee
(Continued)

FOREIGN PATENT DOCUMENTS

| EP | 2 644 782 A2 | 10/2013 |
| WO | 98/03813 A1 | 1/1998 |
| WO | 2015/097388 A1 | 7/2015 |

OTHER PUBLICATIONS

Koenig S: Winkelausgleich-Schelle Fuer Rohre Und Schlaeuche-, 0 & P—Oelhydraulik Und Pneumatik: Zeitschrift Fuer Fluidtechnik, Aktorik, Steuerelektronik Und Sensorik, Vereinigte Fachverlage GmbH, DE, vol. 41, No. 11/12, Nov. 1, 1997 (Nov. 1, 1997), p. 818,821, XP000731720, ISSN: 0341-2660.
(Continued)

*Primary Examiner* — Alfred J Wujciak
(74) *Attorney, Agent, or Firm* — Klintworth & Rozenblat IP LLP

(57) ABSTRACT

A clamp fastening device is configured to attach a work line to a work machine. The clamp fastening device includes a clamp structure with a line aperture configured to receive the line. The clamp structure is configured to releasably clamp to and retain a segment of the line within the line aperture. The clamp fastening device also includes a mount structure configured to be supported on an area of the work machine. The mount structure is moveably attached to the clamp structure to support movement of the clamp structure relative to the mount structure along at least one direction. The mount structure is configured to support movement of the clamp structure and the segment of the line relative to the area of the work machine along the at least one direction.

10 Claims, 7 Drawing Sheets

(51) Int. Cl.
*F16L 3/16* (2006.01)
*E02F 9/22* (2006.01)

(56) References Cited

U.S. PATENT DOCUMENTS

| | | | | |
|---|---|---|---|---|
| 5,128,841 | A * | 7/1992 | Maglica | B62J 6/00 248/288.31 |
| 5,261,633 | A | 11/1993 | Mastro | |
| 5,803,642 | A * | 9/1998 | Sassmannshausen | F16C 11/0604 248/124.1 |
| 6,892,990 | B2 * | 5/2005 | Pisczak | H02G 7/053 248/62 |
| 6,988,696 | B2 * | 1/2006 | Attee | B25B 5/147 248/214 |
| 7,534,965 | B1 * | 5/2009 | Thompson | H02G 3/22 16/2.1 |
| 2014/0371801 | A1 * | 12/2014 | Dall | A61B 17/6466 606/86 R |
| 2018/0317966 | A1 * | 11/2018 | Riccione | A61B 17/6466 |

OTHER PUBLICATIONS

Extended European Search Report issued for EP 18 15 8869 dated Aug. 24, 2018, 7 pages.

* cited by examiner

CLAMP COUPLER FOR WORK LINES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to clamp couplers for various work lines.

BACKGROUND OF THE DISCLOSURE

Some work vehicles and implements may include one or more hoses, cables, tubes, wire, flexible pipe, conduits, or other work lines. These work lines may have an end connected to one component of the work machine and a second end connected to another component of the work machine. In some cases, the work lines may be configured to convey a hydraulic fluid, a pneumatic fluid, or an electrical current between the components. In other words, the work lines may establish hydraulic, pneumatic, or electrical communication between the components.

For example, in a work vehicle, hydraulic lines may extend between and connect a hydraulic fluid source and a hydraulic actuator. The hydraulic actuator may be configured for actuating an implement, for driving a ground wheel in rotation, or for actuating another component. In other words, hydraulic fluid may flow through the lines to operate the actuator to drive movement of the implement, ground wheel, or other component.

SUMMARY OF THE DISCLOSURE

This disclosure provides a clamp fastening device for movably attaching one or more work lines to a work vehicle.

In one aspect, the disclosure provides a clamp fastening device configured to attach a work line to a work machine. The clamp fastening device includes a clamp structure with a line aperture configured to receive the line. The clamp structure is configured to releasably clamp to and retain a segment of the line within the line aperture. The clamp fastening device also includes a mount structure configured to be supported on an area of the work machine. The mount structure is moveably attached to the clamp structure to support movement of the clamp structure relative to the mount structure along at least one direction. The mount structure is configured to support movement of the clamp structure and the segment of the line relative to the area of the work machine along the at least one direction.

In another aspect, a method of manufacturing a clamp fastening device configured for supporting a work line on a work machine. The method includes forming a clamp structure with a line aperture configured to receive the line. The clamp structure is configured to releasably clamp to and retain a segment of the line within the line aperture. The method also includes forming a mount structure configured to be supported on an area of the work machine. Additionally, the method includes moveably attaching the clamp structure to the mount structure such that the mount structure supports movement of the clamp structure relative to the mount structure along at least one direction. The mount structure is configured to support movement of the clamp structure and the segment of the line relative to the area of the work machine along the at least one direction.

In an additional aspect, the disclosure provides a work vehicle that includes a first part and a second part that is moveably attached to the first part via a joint. The work vehicle further includes a line that extends between the first part and the second part. The line is configured to flex when the second part moves relative to the first part. The work vehicle further includes a clamp fastening device that includes a clamp structure with a plurality of clamp pieces that cooperate to define a line aperture. The line aperture is configured to receive the line. The clamp structure is configured to releasably clamp to and retain a segment of the line within the line aperture. The clamp fastening device further includes a mount structure configured to fixedly attach to the first part or the second part of the work vehicle. The mount structure is moveably attached to the clamp structure to support movement of the clamp structure relative to the mount structure along at least one direction. Additionally, the mount structure is configured to support movement of the clamp structure and the segment of the line relative to the work vehicle along the at least one direction.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
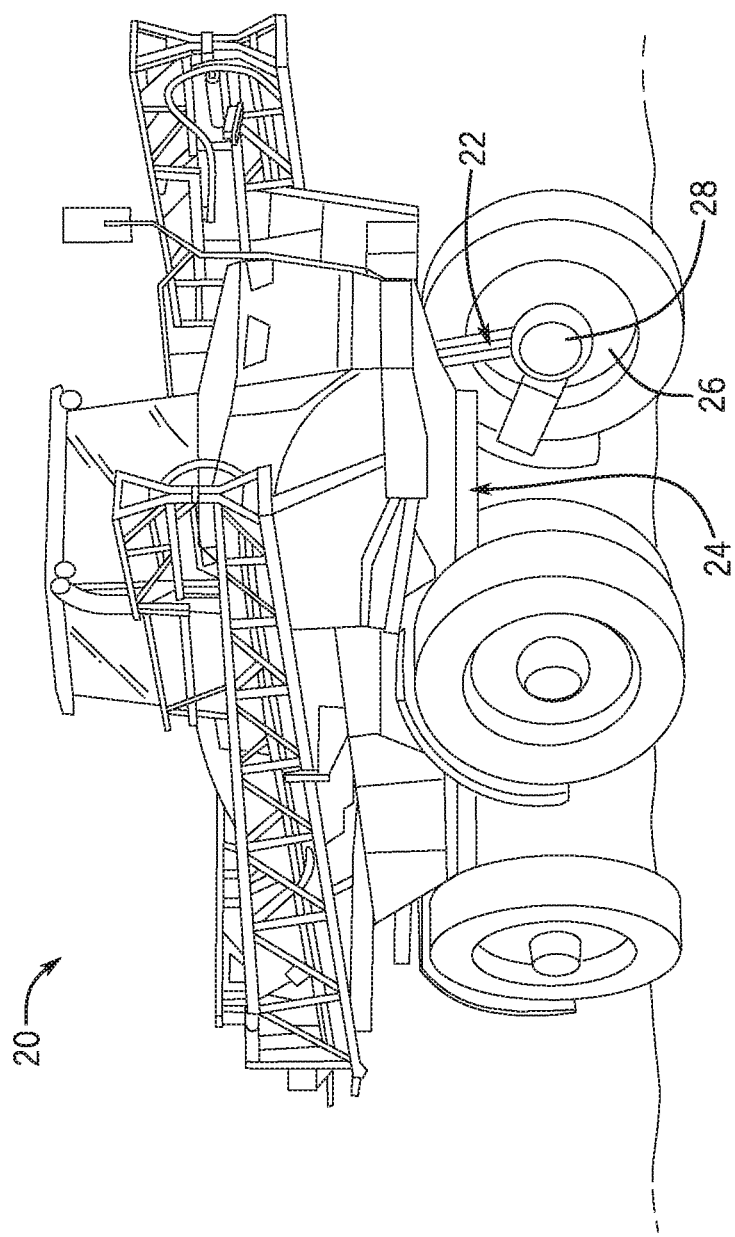
FIG. 1 is a perspective view of a work vehicle that includes at least one work line that is attached via at least one clamp fastening device of the present disclosure.

The following describes one or more example embodiments of clamp fastening device for movably supporting one or more work lines on a work machine, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Conventional clamps may be used to attach work lines to the work vehicle. For example, clamps may fixedly attach to a segment of the lines and a support structure of the work vehicle. Thus, the clamped segment of the line is intended to remain substantially fixed relative to the support structure of the work vehicle.

In many cases, however, a first clamp attaches the line to a first support structure of the work vehicle, and a second clamp attaches the line to a second support structure of the work vehicle. Operation of the work vehicle causes the first and second support structures to move relative to each other. Thus, the line flexes (i.e., bends, twists, translates, etc.) to accommodate such movement of the work vehicle. This movement may cause excessive friction between the line and the first clamp and/or between the line and the second clamp. This friction may cause premature wear of the line.

Likewise, in the case of hydraulic and pneumatic lines, pressure changes within the line may cause flexure of the line. More specifically, the line may have a longitudinal axis, and internal pressure changes within the line may flex the line (outwardly and/or inwardly) in the radial direction relative to the longitudinal axis. In cases in which the ends of the line are fixed, the radial flexure of the line may cause the line to rub against the clamp, causing premature wear of the line.

The following describes one or more example implementations of the disclosed clamp fastening device for movably supporting a flexible line on a work machine, such as a work vehicle. The disclosed clamp fastening device, its method of manufacture and assembly, and its method of operation provide a number of benefits as compared to conventional clamp fastening devices.

The clamp fastening device may generally include a clamp structure that receives and surrounds at least a portion of the line. The line may, in some embodiments, pass through an aperture of the clamp structure. The clamp structure may clamp onto and retain the line by applying a clamping force to the line (i.e., a force directed substantially radially inward and generally toward a central axis of the line). The clamp fastening device may also include a mount structure configured to be supported on an area of the work machine. The mount structure may receive and surround at least a portion of the clamp structure. The mount structure may be moveably attached to the clamp structure to support movement of the clamp structure relative to the mount structure along at least one direction. Accordingly, the mount structure may support movement of the clamp structure (and the line segment clamped therein) relative to the supporting area of the work machine.

In some embodiments, the mount structure may support sliding movement of the clamp structure. For example, in some embodiments, the clamp structure may include a contoured surface, and the mount structure may include an inversely contoured surface. The inversely contoured surfaces may slide relative to each other as the clamp structure moves relative to the mount structure.

Additionally, in some embodiments, the mount structure may support the clamp structure for linear movement (i.e., linear translation). Furthermore, in some embodiments, the mount structure may support the clamp structure for angular movement about at least one axis. Moreover, in some embodiments, the mount structure may support the clamp structure for both linear movement and angular rotation.

Thus, the clamp fastening device of the present disclosure may allow the line to flex and self-adjust, for example, when the supporting area of the work machine articulates about a joint. As such, the line is less prone to wear. The clamp fastening device may also present various manufacturing advantages. The parts of the clamp fastening device may be manufactured in a relatively shod amount of time. Also, the device includes relatively few parts, allowing the clamp fastening device to be assembled and disassembled quickly and efficiently.

Figure 2:
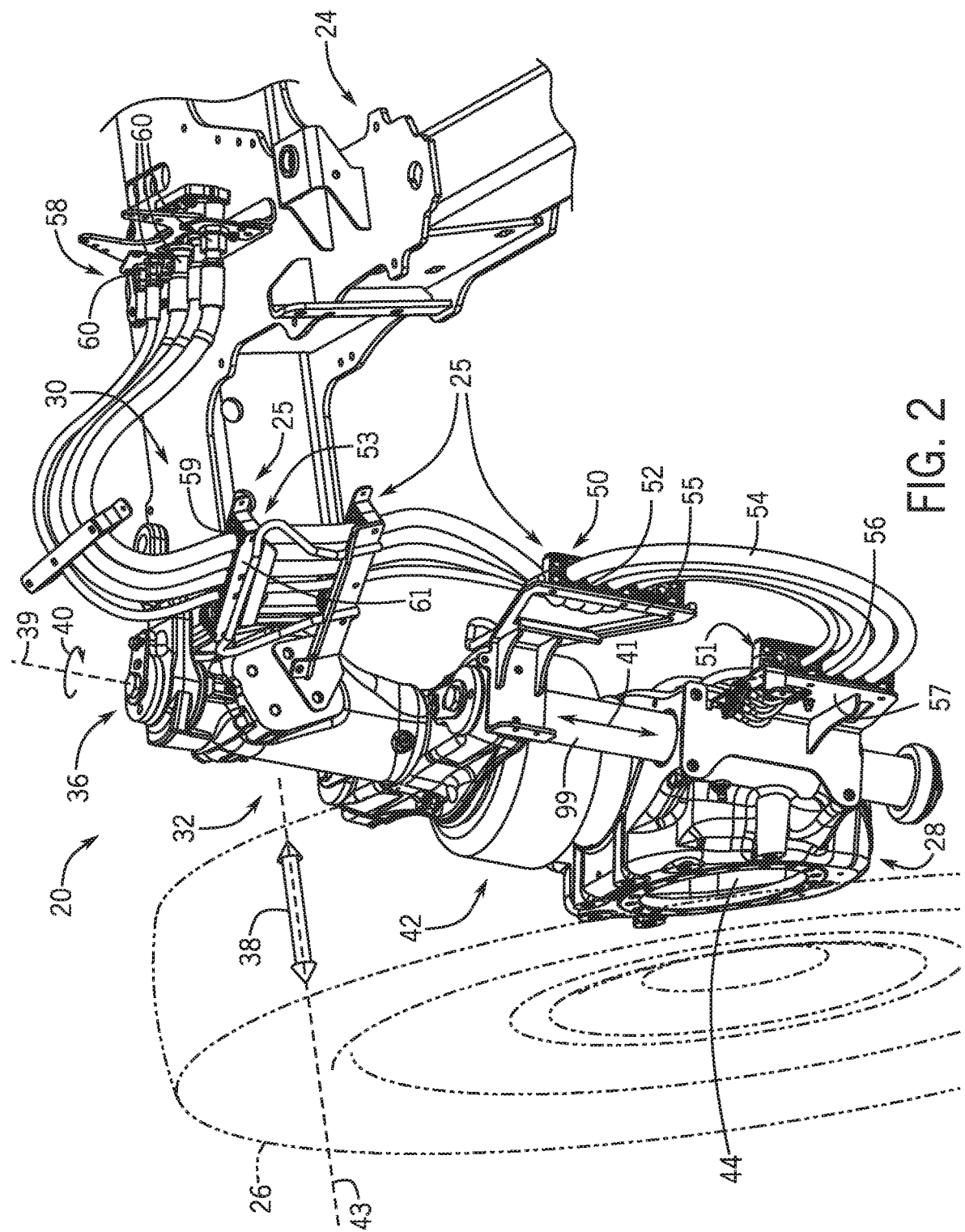
FIG. 2 is a perspective view of a component of the work vehicle of FIG. 1, wherein a plurality of work lines and a plurality of clamp fastening devices of the present disclosure are shown according to example embodiments of the present disclosure.

FIG. 1 illustrates a work vehicle 20, such as a sprayer vehicle. The work vehicle 20 includes a plurality of work lines 22. The lines 22 may be hoses, cables, tubes, wire, flexible pipe, or other similar conduits. The lines 22 may be flexible, allowing some degree of bending, twisting, and/or radial flexure. As shown in FIG. 2, the work vehicle 20 may also include a plurality of clamp fastening devices 25 that moveably attach the lines 22 to the work vehicle 20.

As shown in FIGS. 1 and 2, the work vehicle 20 includes a chassis 24 and a plurality of wheels 26. The wheels 26 are mounted to the chassis 24 via a wheel hub 28. In the embodiment shown, the lines 22 extend generally between the chassis 24 and the wheel hub 28. It will be appreciated, however, that the lines 22 may be routed across the work vehicle 20 in another manner, along another direction, and/or between different support structures without departing from the scope of the present disclosure. Moreover, it will be appreciated that the work vehicle 20 is but one example of a work machine that may be used in association with the clamp fastening devices 25 of the present disclosure.

As shown in FIG. 2, the chassis 24 may include two or more parts that articulate relative to each other. For example, the chassis 24 may include a horizontal support beam 30 and a knee structure 32. A first joint 36 may moveably attach the knee structure 32 to the support beam 30. More specifically, in some embodiments, the first joint 36 may support substantial linear movement of the knee structure 32 in a lateral direction along a cross-vehicle axis 43 as indicated by arrow 38.

A second joint 42 may moveably attach the wheel hub 28 to the knee structure 32. For example, the second joint 42 may support angular movement of the hub 28 relative to the knee structure 32 about an axis 39 as indicated by arrow 40. This angular movement at the second joint 42 may also allow steering of the wheel 26. The hub 28 may also be supported for linear movement relative to the knee structure 32 along the axis 39 as well as indicated by arrow 41. This linear movement may allow a suspension component 99 (e.g., an air spring) to absorb impact, vibration, and or other loads from the wheel hub 28.

In some embodiments, the hub 28 may include an actuator 44. In some embodiments, the actuator 44 may be configured to drive and rotate the wheel 26 to propel the work vehicle 20. Also, in some embodiments, the actuator 44 may be configured to steer the wheel 26 by rotating the hub 28 about the axis 39. In some embodiments, the actuator 44 may include at least one hydraulic actuator. However, it will be appreciated that the actuator 44 may include at least one electric motor, a pneumatic actuator, or other type of actuator without departing from the scope of the present disclosure.

The line 22 may extend between the actuator 44 and a fixed connector mount 58, which is fixed to the chassis 24 (e.g., the horizontal support beam 30). The fixed connector mount 58 may include one or more connectors 60, which connect to respective ones of the lines 22. The connectors 60, in turn, may be fluidly connected to a source, such as a hydraulic pump, a hydraulic fluid tank, etc. Accordingly, the lines 22 may provide hydraulic fluid flow between the actuator 44, the connectors 60, and any hydraulic pump, fluid tank, etc. for operations of the actuator 44. Electrical systems may be configured similarly such that the lines 22 provide electrical power to the actuator 44 from electrical power source. Furthermore, pneumatic systems may be configured similarly such that the lines 22 provide pneumatic power to the actuator 44 from a pneumatic pump, etc.

The clamp fastening devices 25 may support the lines 22 relative to one or more of the articulating parts of the work vehicle 20. For example, the plurality of clamp fastening devices 25 may include a first clamp fastening device 50 and a second clamp fastening device 51. The first clamp fastening device 50 may clamp to a first segment 52 of a line 54, and the first clamp fastening device 50 may also be fixed to an area 55 of the knee structure 32. Likewise, the second clamp fastening device 51 may clamp to a second segment 56 of the line 54, and the clamp fastening device 50 may also be fixed to an area 57 of the hub 28.

However, as will be discussed in detail below, the first clamp fastening device 50 may support a predetermined amount of movement of the first segment 52 relative to the area 55 of the knee structure 32. Likewise, the second clamp fastening device 51 may support a predetermined amount of movement of the second segment 56 relative to the area 57 of the hub 28. Accordingly, the line 54 may flex, for example, as the hub 28 articulates relative to the knee structure 32 about the second joint 42. The first and second clamping devices 50, 51 may secure the line 54 to the work vehicle 20, but support a small, but significant amount of movement. Thus, the line 54 can shift slightly and adjust in a way that reduces load concentrations on the line 54 from the first and second clamp fastening devices 50, 51. As such, the line 54 may be less prone to wear.

Similarly, the clamp fastening devices 25 may include a third clamp fastening device 53. The third clamp fastening device 53 may clamp to a third segment 59 of the line 54. The third clamp fastening device 53 may be supported against a support area 61 of the work machine knee structure 32. Specifically, in some embodiments, the third clamp fastening device 53 may abut against the support area 61 for support and the third clamp fastening device 53 may also move away from the support area 61. When the third clamp fastening device 53 abuts the support area 61, the third clamp fastening device 53 may support a predetermined amount of movement of the third segment 59 relative to the support area 61.

The clamp fastening devices 50, 51, 53 may be used to comply with one or more industry accepted standards for routing the line 54. For example, the clamp fastening devices 50, 51 may be used to comply with SAEJ1273, entitled "Recommended Practices for Hydraulic Hose Assemblies".

Figure 3:
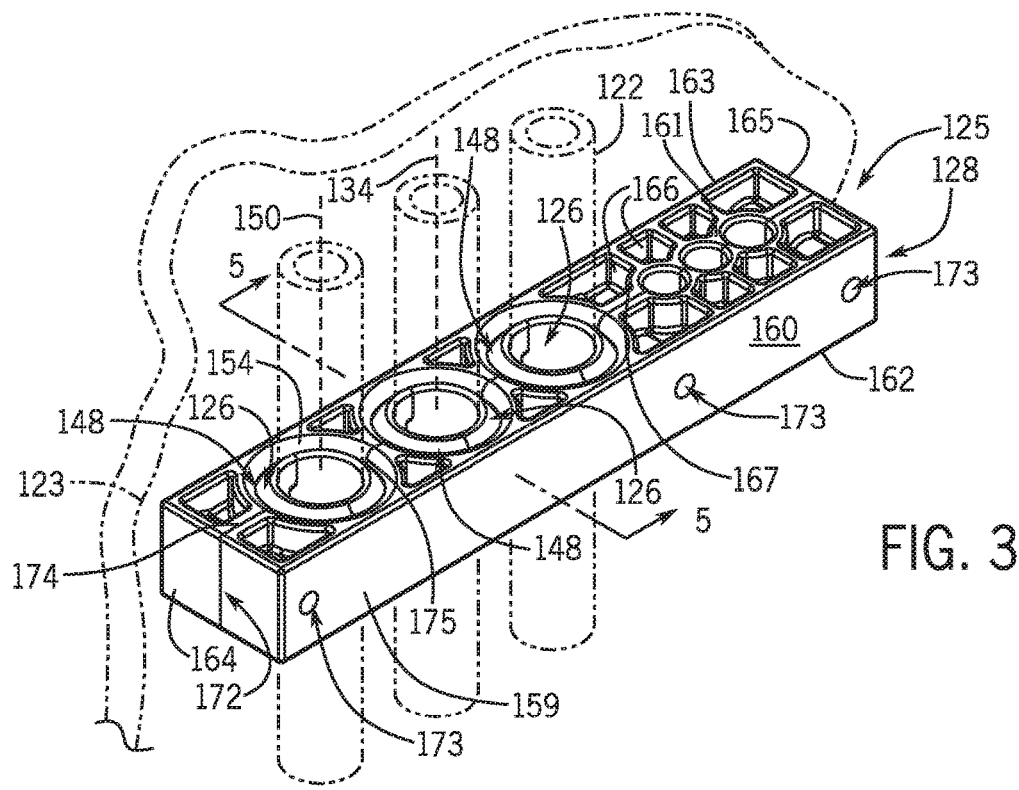
FIG. 3 is a perspective view of a clamp fastening device for the work vehicle of FIGS. 1 and 2 according to an example embodiment.

Referring now to FIG. 3, a clamp fastening device 125 is shown according to an example embodiment of the present disclosure. Lines 122 are shown in phantom clamped within the clamp fastening device 125. An area 123 of a work machine on which the clamp fastening device 125 is supported is also shown in phantom. It will be appreciated that the area 123 may correspond to a structure of the work vehicle 20 of FIGS. 1 and 2 in some embodiments. Like the embodiments discussed above, the clamp fastening device 125 may clamp onto the lines 122 and may be fixedly attached to the area 123 of the work machine.

Figure 4:
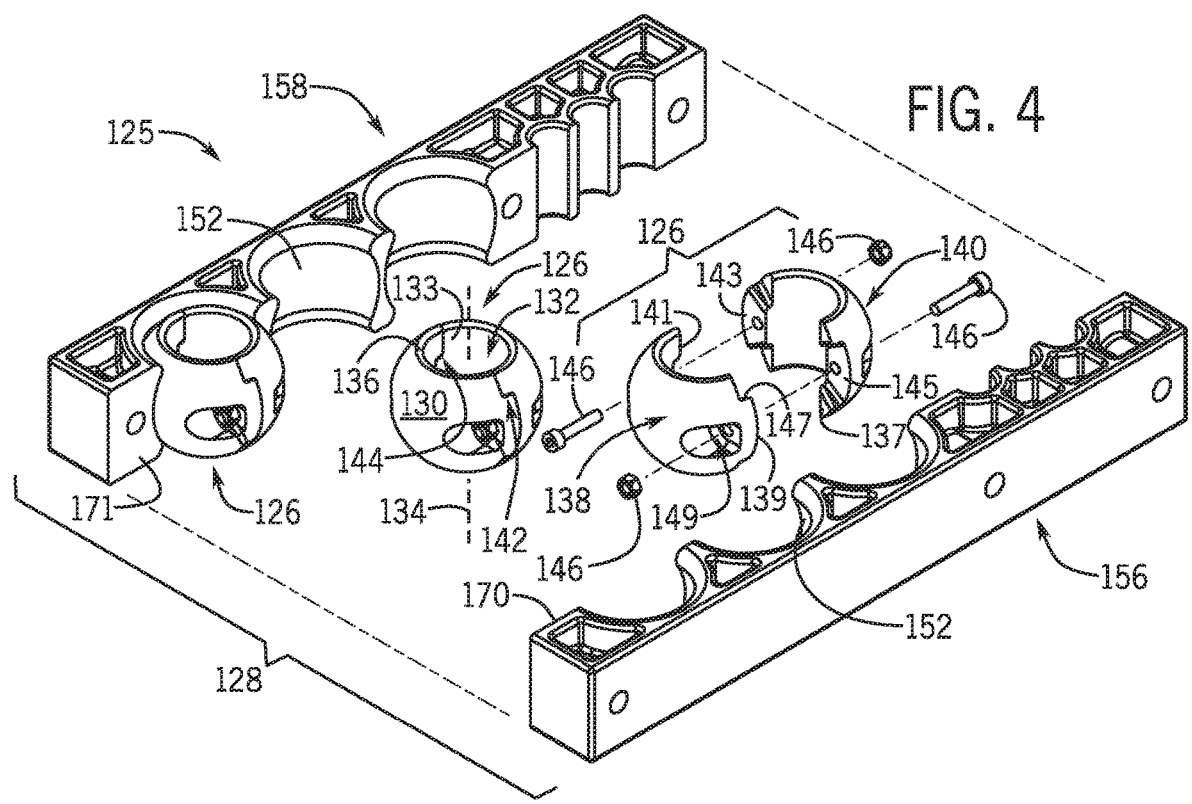
FIG. 4 is an exploded view of the clamp fastening device of FIG. 3.

As shown in FIGS. 3 and 4, the clamp fastening device 125 may generally include at least one clamp structure 126. As shown in the illustrated embodiment, the clamp fastening device 125 may include three clamp structures 126. However, it will be appreciated that the clamp fastening device 125 may include any number of clamp structures 126. The clamp structures 126 may be substantially similar to each other in some embodiments.

The clamp structure 126 may be rounded in shape and may include a contoured exterior surface 130 (FIG. 4). For example, the clamp structure 126 may be annular in shape to as to extend circumferentially about a clamp structure axis 134. Also, the exterior surface 130 may be three-dimensionally contoured in some embodiments such that the clamp structure 126 is somewhat spherical. Also, in some embodiments, the clamp structure 126 may include a line aperture 132 defined by an interior surface 133. The clamp structure axis 134 may extend through the line aperture 132. In some embodiments, the line aperture 132 may be a through-hole that extends through the clamp structure 126. The clamp structure axis 134 may be a straight, linear axis and may extend through the center of the clamp structure 126 in some embodiments.

Moreover, the line aperture 132 may include a rim 136 at both ends. The interior surface 133 and the exterior surface 130 may generally intersect at the rims 136. In some embodiments, the rims 136 may be rounded, beveled, or chamfered.

As shown in FIG. 3, the line aperture 132 may receive a respective line 122. Also, the interior surface 133 of the clamp structure 126 may apply a clamping force (i.e., a force directed substantially radially inward and generally toward the clamp structure axis 134) to the external surface of the line 122. Accordingly, the clamp structure 126 may retain the clamped segment of the line 122 within the line aperture 132 and substantially prevent movement of the clamped segment of the line 122 relative to the clamp structure 126.

In some embodiments represented in FIG. 4, the clamp structure 126 may include a plurality of pieces configured to cooperatively define the clamp structure 126. For example, the clamp structure 126 may include a first piece 138 and a second piece 140.

In some embodiments, the first piece 138 may include a first end 139 and a second end 141 and may extend arcuately about the clamp structure axis 134 between the first end 139 and the second end 141. The second piece 140 may be similar contoured and may extend arcuately between a respective first end 143 and a second end 137. In some embodiments, the first piece 138 may define approximately half the clamp structure 126 (i.e., approximately half of the total exterior surface 130, interior surface 133, and rim 136), and the second piece 140 may define the other half. Thus, the first piece 138 and the second piece 140 may both be substantially hemispherical in shape.

The first piece 138 and the second piece 140 may removably attach together to cooperatively define the exterior surface 130 as well as the interior surface 133 of the clamp structure 126. When attached, the first end 139 of the first piece 138 and the second end 137 of the second piece 140 may mate to define a first seam 142 of the clamp structure 126, and the second end 141 of the first piece 138 and the first end 143 of the second piece 140 may mate to define a second seam 144 of the clamp structure 126. The first seam 142 and the second seam 144 may be disposed substantially symmetrically on opposite sides of the clamp structure axis 134. In some embodiments, at least one seam 142, 144 may be uneven. More specifically, in some embodiments, at least one seam 142, 144 may be defined by a recess 145 of one piece 138, 140 and a projection 147 of the opposing piece 138, 140. The recess 145 may receive the projection 147 to secure the attachment of the pieces 138, 140.

In some embodiments, fasteners 146, such as nuts and bolts, may be used for removably attaching the first piece 138 and the second piece 140 together. At least one of the fasteners 146 may extend in a chord-wise direction through the first piece 138 and the second piece 140 and through the respective seam 142, 144. Additionally, in some embodiments, the clamp structure 126 may include one or more exterior recesses 149 that allow the fastener 146 to seat against the clamp structure 126. It will be appreciated that the fasteners 146 are examples and that the pieces 138, 140 of the clamp structure 126 may be attached in other ways without departing from the scope of the present disclosure.

When the first and second pieces 138, 140 are attached together (i.e., when the clamp structure 126 is in an assembled position), the first and second pieces 138, 140 may cooperate to surround and encircle the respective segment of the line 122 and clamp to the line 122. When the first and second pieces 138, 140 are detached (i.e., when the clamp structure 126 is in a disassembled position) the first and second pieces 138, 140 may be separated apart at the first and second seams 144, allowing the line 122 to move into and out of the line aperture 132.

As shown in FIG. 3, the clamp fastening device 125 may also generally include a mount structure 128. The mount structure 128 may be moveably attached to the clamp structures 126. Also, the mount structure 128 may be supported on the area 123 of the work machine. For example, the mount structure 128 may abut the area 123 for support. Also, in some embodiments, the mount structure 128 may fixedly attach to the area 123 of the work machine.

In some embodiments, the mount structure 128 may be elongate and shaped generally as a rectangular cuboid so as to define an external surface 160 with a front face 161, a back face 162, a first side 159, a second side 163, a first end 164, and a second end 165. Also, as shown, the front face 161 may include a plurality of recesses 166. The recesses 166 may be recessed generally toward the back face 162. Although not shown, the back face 162 may include similar recesses. The recesses 166 may reduce the material weight of the mount structure 128. Also, ribs 167 may be defined between adjacent recesses 166 and may provide stiffness to the mount structure 128.

In some embodiments, the mount structure 128 may include at least one mount aperture 148. In the embodiment shown, there are three mount apertures 148 that receive respective ones of the clamp structures 126. The mount apertures 148 may be through-holes that pass through both the front face 161 and the back face 162. The mount apertures 148 may be defined by a respective internal surface 152 (FIG. 4). Also, the mount apertures 148 may be substantially centered about a respective mount structure axis 150.

In some embodiments, the internal surface 152 may be contoured in a circumferential direction about the respective mount structure axis 150. Also, the contour of the internal surface 152 may be substantially inverse to that of the exterior surface 130 of the respective clamp structure 126. Thus, the internal surface 152 may be concave and three-dimensionally curved in some embodiments.

Moreover, the mount aperture 148 may include a rim 154 at both ends. The external surface 160 and the internal surface 152 may generally intersect at the rim 154. In some embodiments, the rim 154 may be rounded, beveled, or chamfered.

As shown in FIGS. 3 and 4, the mount apertures 148 may receive respective ones of the clamp structure 126. In some embodiments, the internal surface 152 of the mount structure 128 may slidingly support the exterior surface 130 of the clamp structure 126. In some embodiments, a lubricant may be provided between the internal surface 152 and the exterior surface 130 to further support the sliding, angular movement. However, it will be appreciated that the lubricant is optional, and the internal surface 152 may abut the exterior surface 130 for supporting the sliding, angular movement. It will be appreciated that the mount structure 128 may support the clamp structure 126 for angular rotation, for example, for varying an orientation of the clamp structure axis 134 relative to the mount structure axis 150. Also, the mount structure 128 may support the clamp structure 126 for angular rotation about the mount structure axis 150 (e.g., rotation of the clamp structure 126 about the mount structure axis 150 when the clamp structure axis 134 and mount structure axis 150 remain substantially aligned).

As shown in FIGS. 3 and 4, the mount structure 128 may include a plurality of pieces that cooperate to define the mount structure 128. For example, the mount structure 128 may include a first piece 156 and a second piece 158. In some embodiments, the first and second pieces 156, 158 may be mirror-images of each other. The first piece 156 may define approximately half of the mount structure 128 (i.e., approximately half of the external surface 160, the internal surfaces 152, and the rims 154. The second piece 158 may define the other half. The first piece 156 may include a first mating face 170, and the second piece 158 may include a second mating face 171.

The first piece 156 and the second piece 158 may removably attach to cooperatively define the external surface 160 as well as the internal surfaces 152 of the mount structure 128. When attached, the first mating face 170 and the second mating face 171 may mate to define a seam 172 (FIG. 3) that extends generally between the first end 164, the second end 165, the front face 161, and the back face 162 of the mount structure 128. The seam 172 may include a first seam portion 174 and a second seam portion 175, which are disposed on opposite sides of the mount structure axis 150 for a single one of the mount apertures 148.

In some embodiments, fasteners such as bolts may extend through fastener apertures 173 to removably attach the first and second pieces 156, 158 together. More specifically, the fastener apertures 173 may extend through the first side 159, the first mating face 170, the second mating face 171, and the second side 163 of the mount structure 128. Additionally, one end of the fastener may fixedly attach to the area 123 of the work machine. It will be appreciated that the mount structure 128 may be attached to the area 123 in other ways without departing from the scope of the present disclosure. Also, it will be appreciated that instead of fixedly attaching to the area 123, the mount structure 128 may abut against the area 123 in one position and may move away from the area 123 in another position.

When the first and second pieces 156, 158 are attached together (i.e., when the mount structure 128 is in an assembled position), the first and second pieces 156, 158 may cooperate to enclose, surround, and partially encapsulate the clamp structures 126 within the mount apertures 148. When the first and second pieces 156, 158 are detached (i.e., when the mount structure 128 is in a disassembled position) the first and second pieces 156, 158 may be separated apart at the seam 172, allowing the clamp structures 126 to move into and out of the mount structure 128.

Figure 5:
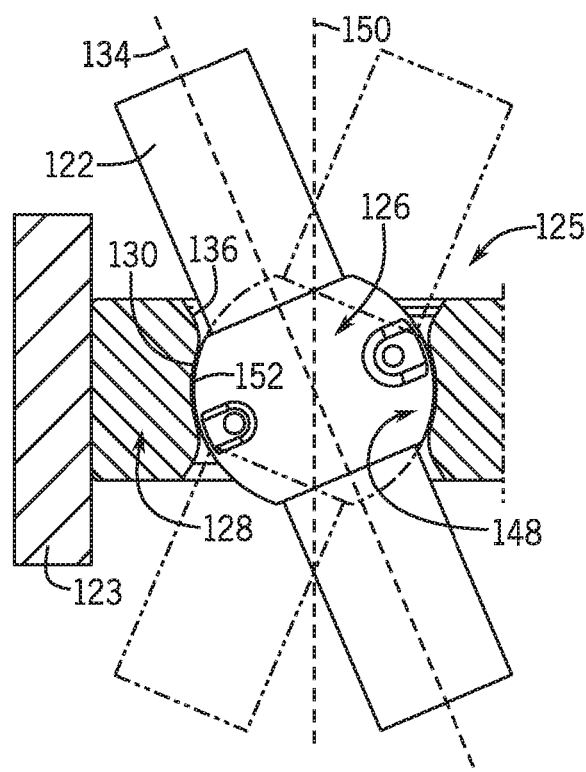
FIG. 5 is a section view of the clamp fastening device taken along the line 5-5 of FIG. 3.

Referring now to FIG. 5, operation of the clamp fastening device 125 will be discussed. As shown, the mount structure 128 moveably attaches to the clamp structure 126 to support angular movement within the mount aperture 148. In this embodiment, the mount structure 128 and clamp fastening device 125 are moveably attached, similar to a ball-and-socket joint. Accordingly, the mount structure 128 supports angular rotation of the clamp structure 126 (and the clamped segment of the line 122) such that the orientation of the clamp structure axis 134 may vary relative to the mount structure axis 150. More specifically, the clamp structure 126 may rotate within the mount structure 128 between a first position (shown in solid lines) and a second position (shown in phantom). Also, the rim 136 of the mount aperture 148 may be rounded as shown in FIG. 5 to provide clearance for the line 122 during movement of the clamp structure 126. It will be appreciated that the clamp structure 126 may also have a third position in which the clamp structure axis 134 and the mount structure axis 150 are substantially aligned (see FIG. 3). The mount structure 128 may also support rotation of the clamp structure 126 about the mount structure axis 150. However, the mount structure 128 may limit and/or prevent linear movement of the clamp structure 126 along the mount structure axis 150.

Accordingly, the clamp fastening device 125 may support a small but significant amount of movement of the line 122 relative to the area 123 of the work machine, for example, as the work machine articulates. This may make the line 122 less prone to wear. Also, the clamp fastening device 125 includes relatively few parts that may be assembled and disassembled easily. As such, the clamp fastening device 125 may be manufactured in an efficient manner. Also, the line 122 may be secured within the clamp fastening device 125 quickly and easily, and conversely, the line 122 may be unsecured from the work machine quickly and easily as well.

Figure 6:
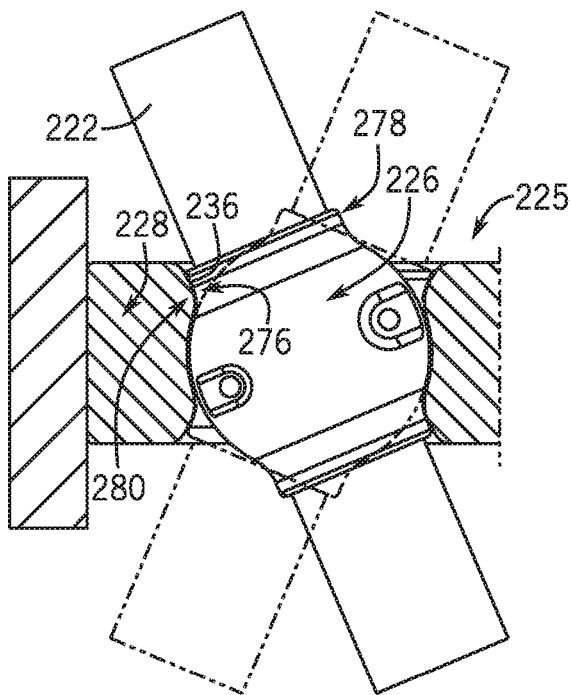
FIG. 6 is a section view of the clamp fastening device according to an additional example embodiment of the present disclosure.

Referring now to FIG. 6, the clamp fastening device 225 is illustrated according to additional embodiments. The clamp fastening device 225 may have one or more features in common with the clamp fastening device 125 of FIGS. 3-5. Components that correspond to those of FIGS. 3-5 are indicated with corresponding reference numbers increased by 100.

As shown, the rim of the mount structure 228 may define a first abutment surface 276. Also, the clamp structure 226 may include at least one collar 278. The collar 278 may include a second abutment surface 280 on its exterior. The second abutment surface 280 may have a concave cross section as shown in FIG. 6. The first abutment surface 276 may have an inversely contoured convex cross section as shown in FIG. 6. Thus, as the clamp structure 226 moves within the mount structure 228, the first abutment surface 276 may be received within the second abutment surface 280. Also, the first and second abutment surfaces 276, 280 may abut to limit rotational movement of the clamp structure 226 relative to the mount structure 228. Accordingly, the line 222 is unlikely to abut or rub against the mount structure 228. Also, because of the inverse contouring of the abutment surfaces 276, 280, forces may be distributed relatively evenly across the abutment surfaces 276, 280.

Figure 7:
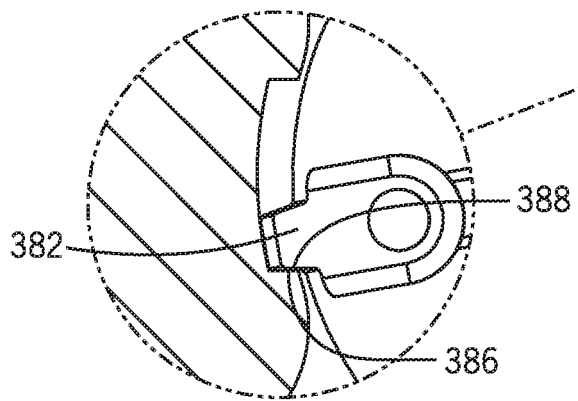
FIG. 7 is a section view of the clamp fastening device according to an additional example embodiment of the present disclosure.

Referring now to FIG. 7, the clamp fastening device 325 is illustrated according to additional embodiments. The clamp fastening device 325 may have one or more features in common with the clamp fastening device 125 of FIGS. 3-5. Components that correspond to those of FIGS. 3-5 are indicated with corresponding reference numbers increased by 200.

As shown, the clamp structure 326 may include a projection 382. The projection 382 may be an annular member that projects annularly away from the clamp structure axis 334. Also, the projection 382 may extend circumferentially about the axis 334 on the exterior surface 330 of the clamp structure 326. In some embodiments, the projection 382 may be substantially equidistant from the opposing rims 336 with respect to the axis 334 of the clamp structure 326.

Moreover, the mount structure 328 may include a cavity 384. The cavity 384 may be an undercut recess within the internal surface 352 of the mount structure 328. The cavity 384 may also be substantially equidistant from the opposing rims 336 of the mount structure 328. The cavity 384 may receive the projection 382 of the clamp structure 326 as shown.

The clamp structure 326 may rotate within the mount structure 328 similar to the embodiments discussed above. However, an axial surface 386 of the projection 382 may abut an axial inner surface 388 of the cavity 384 to limit such rotation of the clamp structure 326 relative to the mount structure 328. Accordingly, the line 322 is unlikely to abut or rub against the mount structure 328.

Figure 8:
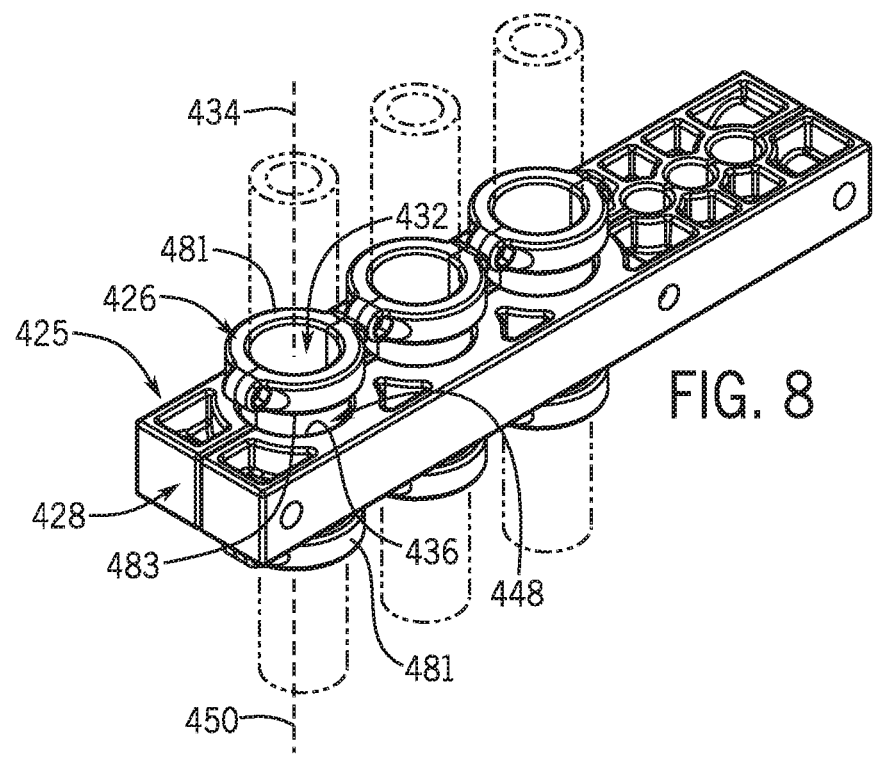
FIG. 8 is a perspective view of the clamp fastening device according to an additional example embodiment of the present disclosure.
Figure 9:
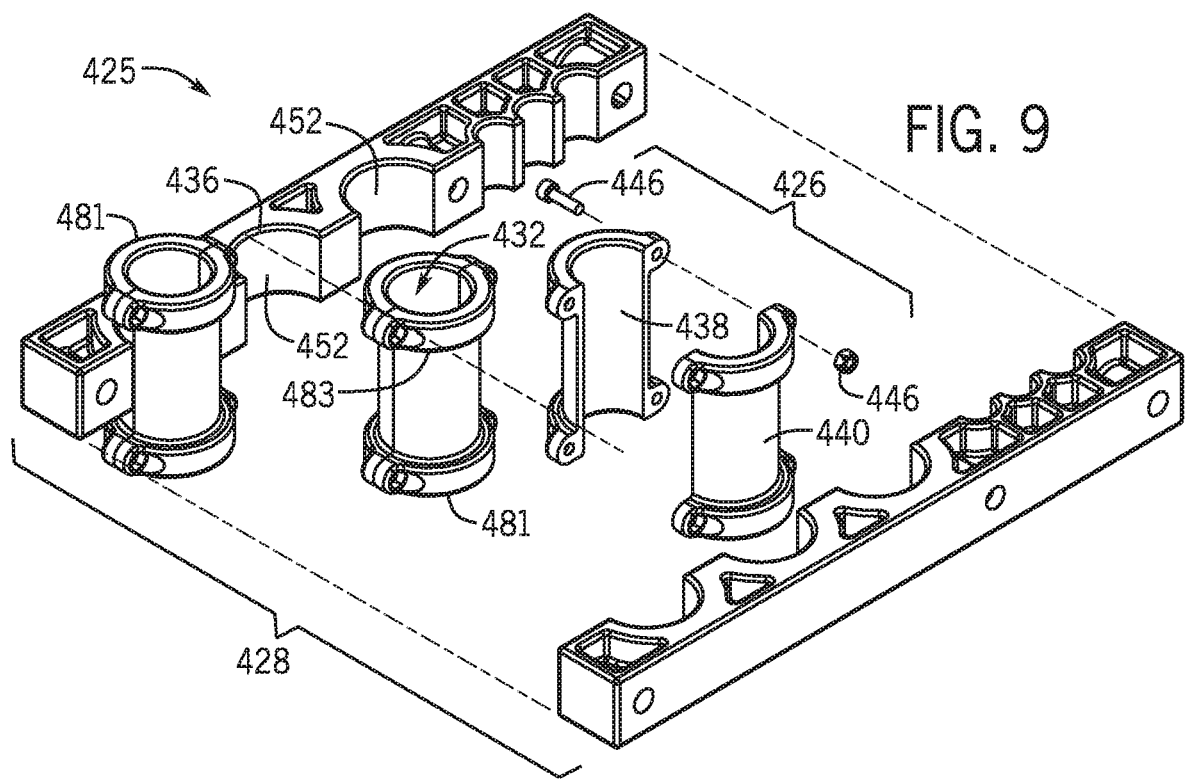
FIG. 9 is an exploded view of the clamp fastening device of FIG. 8.

Referring now to FIGS. 8 and 9, the clamp fastening device 425 is illustrated according to additional embodiments. The clamp fastening device 425 may have one or more features in common with the clamp fastening device 125 of FIGS. 3-5. Components that correspond to those of FIGS. 3-5 are indicated with corresponding reference numbers increased by 300.

The clamp fastening device 425 may generally include one or more clamp structures 426. The clamp structure 426 may cylindrical, and the line apertures 432 may extend axially through the clamp structure 426. The clamp structure 426 may also include enlarged collars 481 at each axial end. The fasteners 446 may extend through respective ones of the collars 481 to removably attach the first and second pieces 438, 440 as shown in FIG. 9.

Moreover, the clamp fastening device 425 may generally include a mount structure 428. The mount structure 428 may include one or more mount apertures 448 configured to receive respective ones of the clamp structures 426. The mount apertures 448 may be defined by respective internal surfaces 452, which are tubular in shape, to receive respective ones of the clamp structures 426.

As shown in FIG. 8, the clamp structure 426 may be received within the mount structure 428 such that the clamp structure axis 434 is substantially aligned with the mount structure axis 450. Also, the mount structure 428 may support linear movement of the clamp structure 426 along the mount structure axis 450. In some embodiments, an inner axial surface 483 may abut against the external surface (e.g., the rim 436) of the mount structure 428 to limit such linear movement of the clamp structure 426 relative to the mount structure 428.

The mount structure 428 may also support rotational movement of the clamp structure 426 therein. More specifically, the clamp structure 426 may rotate about the mount structure axis 450, and the mount structure 428 may maintain the clamp structure axis 434 substantially aligned with the mount structure axis 450 during such rotation. In other words, the mount structure 428 may limit and/or prevent the clamp structure axis 434 from re-orienting relative to the mount structure axis 450.

Figure 10:
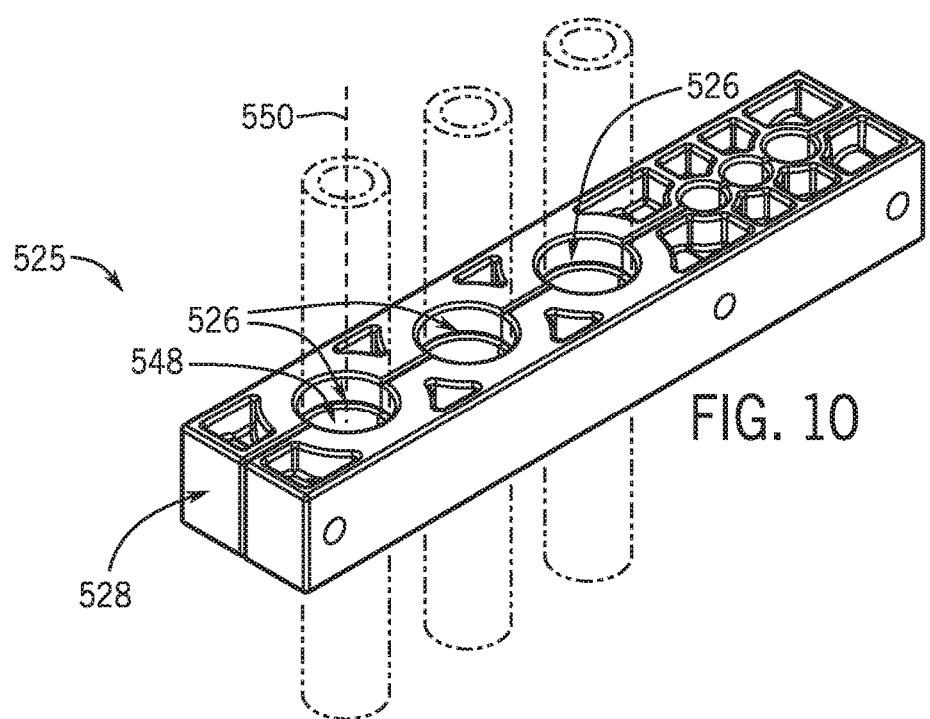
FIG. 10 is a perspective view of the clamp fastening device according to an additional example embodiment of the present disclosure.
Figure 11:
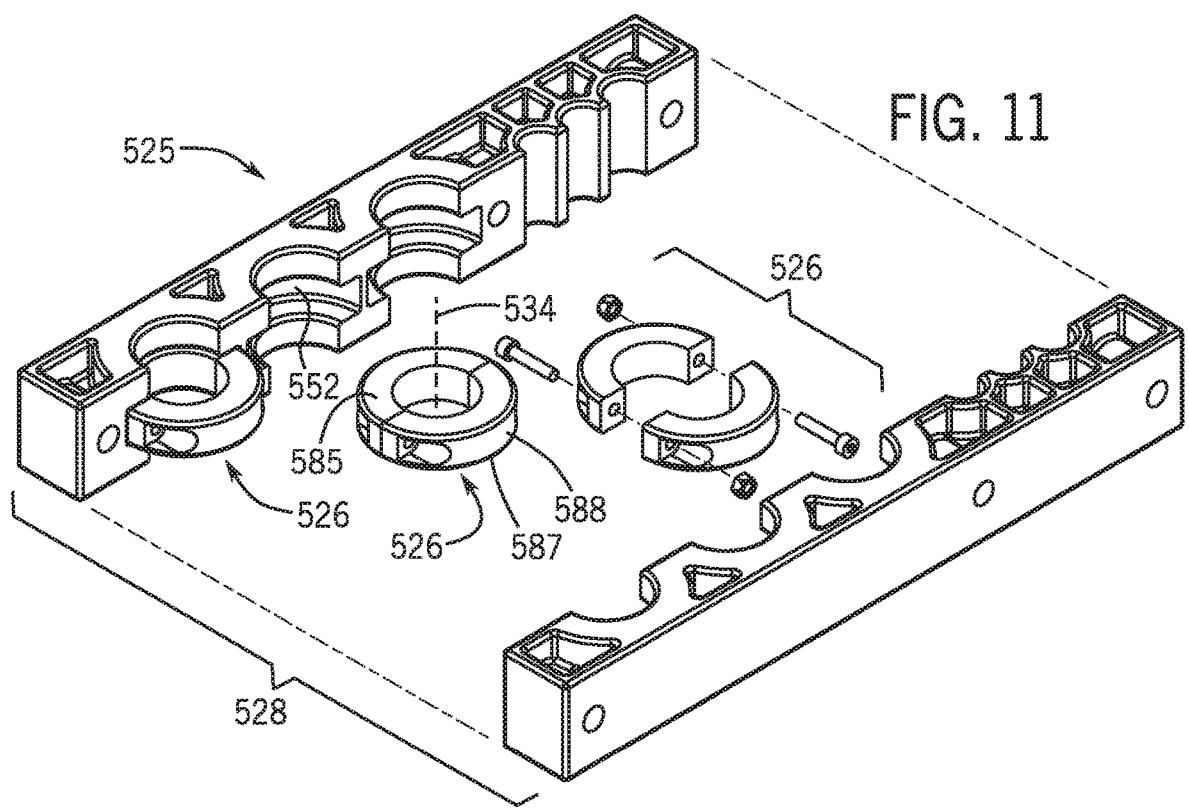
FIG. 11 is an exploded view of the clamp fastening device of FIG. 10.

Referring now to FIGS. 10 and 11, the clamp fastening device 525 is illustrated according to additional embodiments. The clamp fastening device 525 may have one or more features in common with the clamp fastening device 125 of FIGS. 3-5. Components that correspond to those of FIGS. 3-5 are indicated with corresponding reference numbers increased by 400.

The clamp fastening device 525 may generally one or more clamp structures 526. (FIG. 11). The clamp structures 526 may be annular so as to include a radial surface 588 that extends about the clamp structure axis 534 in a circumferential direction. Also, the clamp structures 526 may include a first axial face 585 and an opposite second axial face 587. In some embodiments, the first axial face 585 and the second axial face 587 may be substantially flat.

The mount aperture 548 of the mount structure 528 may include interior surfaces 552 that are inversely contoured to the radial surface 588 and that oppose the first axial face 585 and the second axial face 587. Accordingly, the mount structure 528 may support rotational motion of the clamp structure 526 about the mount structure axis 550. The mount structure 528 may maintain the clamp structure axis 534 substantially aligned with the mount structure axis 550. In other words, the mount structure 528 may prevent rotation and re-orientation of the axis 534 relative to the axis 550. Additionally, as shown in FIG. 11, the first axial face 585 and the second axial face 587 may abut against respective opposing surfaces of the mount aperture 548 to limit (e.g., prevent) linear movement of the clamp structure 526 along the mount structure axis 550. Accordingly, the clamp structure 526 may be nested inside the mount aperture 548 and, yet, the mount structure 528 may support rotation about the axis 550.

Figure 12:
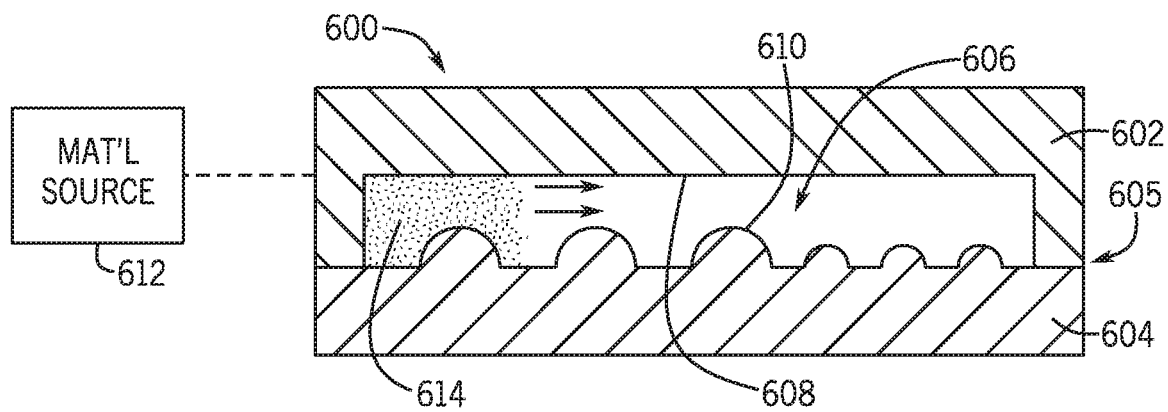
FIG. 12 is a schematic section view of a manufacturing apparatus for manufacturing part of the clamp fastening device of the present disclosure according to an example embodiment.
Figure 13:
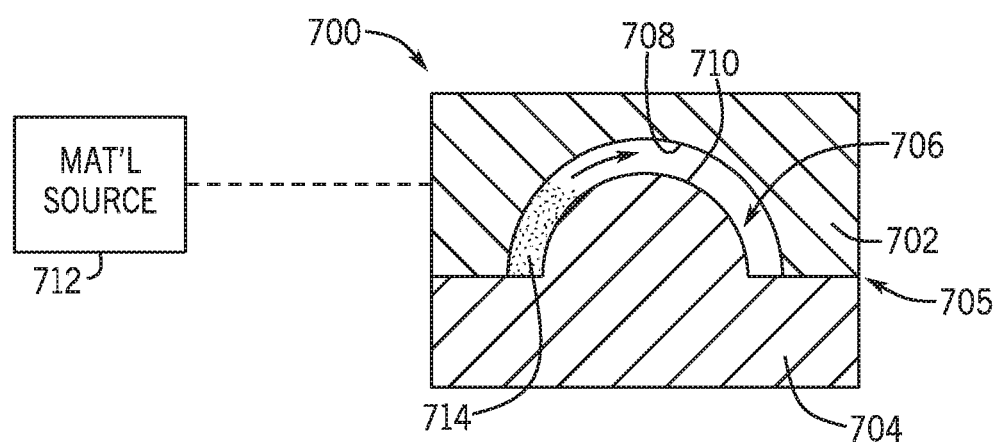
FIG. 13 is a schematic section view of a manufacturing apparatus for manufacturing another part of the clamp fastening device of the present disclosure according to an example embodiment.

Referring now to FIGS. 12 and 13, methods for manufacturing the clamp fastening device of the present disclosure will be discussed. The discussion will refer to manufacture of the clamp fastening device 125 of FIGS. 3-5. However, it will be appreciated that the discussion may apply to manufacture of the clamp fastening devices 225, 325, 425, 525 of FIGS. 6-11, or to another embodiment of the clamp fastening device.

In some embodiments, the pieces 156, 158 of the mount structure 128 may be formed individually using a molding device 600 (FIG. 12), and the pieces 138, 140 of the clamp structure 126 may be formed individually using a molding device 700 (FIG. 13). The molding device 600 may define a mold cavity 606 with internal cavity surfaces 608, 610, and the piece of the mount structure 128 may be formed according to the cavity surfaces 608, 610. The molding device 700 may define a mold cavity 706 with internal cavity surfaces 708, 710, and the piece of the clamp structure 126 may be formed according to the cavity surfaces 708, 710. It will be appreciated that the molding devices 600, 700 may be of various types (e.g., injection molding devices, investment casting devices, etc.) without departing from the scope of the present disclosure. It will also be appreciated that FIGS. 12 and 13 schematically represent the manufacturing process and various modifications may be made within the scope of the present disclosure.

As shown in FIG. 12, the molding device 600 may include a first mold member 602 with a first cavity surface 608 and a second mold member 604 with a second cavity surface 610. The first and second mold members 602, 604 may be mated at a mold mating area 605 to close off the mold cavity 606. Accordingly, the first cavity surface 608 and the second cavity surface 610 may cooperate to define the cavity 606. The molding device 600 may also include a material source 612 that may supply a material 614 (e.g., a polymer, a metallic material, etc.) into the cavity 606. The material 614 may fill the cavity 606 and then harden and cure such that the piece of the mount structure 128 forms according to the first and second cavity surfaces 608, 610. Then, the piece may be removed from the cavity 606.

Similarly, as shown in FIG. 13, the molding device 700 may include a first mold member 702 with a first cavity surface 708 and a second mold member 704 with a second cavity surface 710. The first and second mold members 702, 704 may be mated at a mold mating area 705. Accordingly, the first cavity surface 708 and the second cavity surface 710 may cooperate to define the cavity 706. The molding device 700 may also include a material source 712 that may supply a material 714 (e.g., a polymer, a metallic material, etc.) into the cavity 706. The material 714 may fill the cavity 706 and then harden and cure such that the piece of the clamp structure 126 forms according to the first and second cavity surfaces 708, 710. Then, the piece may be removed from the cavity 706.

As represented in FIG. 12, the second cavity surface 610 may be used to form the contoured internal surface 152 of the mount aperture 148 of the mount structure 128. The second cavity surface 610 may be substantially continuous (i.e., uninterrupted) in areas that form the internal surface 152. In other words, no sprue or material supply openings are included at these areas of the second cavity surface 610. Also, the mold mating area 605 may be spaced apart at a distance away from these areas of the second cavity surface 610. Likewise, as represented in FIG. 13, the first cavity surface 708 may be used to form the contoured exterior surface 130 of the clamp structure 126. The first cavity surface 708 may be substantially continuous and uninterrupted in areas that form the exterior surface 130. Accordingly, the exterior surface 130 of the clamp structure 126 and the internal surface 152 of the mount structure 128 may be free from flash lines, parting lines, or other surface irregularities from the molding process. Thus, the internal surface 152 may support smooth and even sliding support to the exterior surface 130 during operation of the clamp fastening device 125.

Once the pieces are formed, the pieces 138, 140 of the clamp structure 126 may be assembled together, and the pieces 156, 158 of the mount structure 128 may be assembled together as discussed above. Moreover, the clamp fastening device 125 may be attached to the work machine as discussed above, with the clamp structure 126 retaining the line 122, with the mount structure 128 mounted to the work machine, and with the mount structure 128 moveably attached to the clamp structure 126.

Accordingly, the manufacturing methods of the present disclosure allow the clamp fastening device 125 to be made in an efficient, accurate, and repeatable manner. Additionally, the clamp fastening device 125 may include relatively few parts. This aspect increases manufacturability of the clamp fastening device 125. Also, the clamp fastening device 125 may be assembled and disassembled easily and quickly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A clamp fastening device configured to attach work lines to a work machine, the clamp fastening device comprising:
   a plurality of clamp structures each with a line aperture configured to receive one of the lines and to releasably clamp to and retain a segment of the associated line within the line aperture; and
   a mount structure configured to be supported on an area of the work machine, the mount structure defining a plurality of mount apertures arranged in a row with each mount aperture configured to receive one of the clamp structures, the mount structure being an elongated rectangular structure having an external surface with a front face, a back face opposite the front face, opposite first and second side faces and opposite end faces, the mount structure having a first mount piece and a second mount piece each defining a portion of the mount apertures, the front and back faces and the end faces, the first mount piece defining the first side face and the second mount piece defining the second side face, the first mount piece having a first mating face and the second mount piece having a second mating face;
   wherein, in a first position of the mount structure in which the first mating face mates with the second mating face, the first and second mount pieces are configured to support movement of the clamp structures relative to the mount structure and, when the clamp structures are clamped onto the segments of the lines, movement of the segments of the lines relative to the work machine;
   wherein each mount aperture defines a mount structure axis that passes through the associated mount aperture;
   wherein each line aperture defines a clamp structure axis that passes through the associated line aperture; and
   wherein the mount structure is configured to support rotational movement of each clamp structure for varying an orientation of each clamp structure axis relative to the associated mount structure axis.

2. The device of claim 1,
   wherein, in the first position of the mount structure, the mount structure is configured to support linear movement of each clamp structure along the associated axis.

3. The device of claim 1,
   wherein, in the first position of the mount structure, the mount structure is configured to support rotational movement of each clamp structure about the associated axis.

4. The device of claim 1, wherein each clamp structure includes a plurality of clamp pieces;
   wherein, in a first position of each clamp structure, the associated plurality of clamp pieces is configured to cooperatively clamp to and retain the segment of the line; and
   wherein, in a second position of the clamp structure, the plurality of clamp pieces is configured to release from the segment of the associated line.

5. The device of claim 4, wherein the plurality of clamp pieces of each clamp structure, in the first position, are configured to cooperatively enclose the segment of the associated line.

6. The device of claim 4,
   wherein the plurality of clamp pieces of each clamp structure includes a first clamp piece and a second clamp piece that releasably attach at a first seam and a second seam; and
   wherein the first seam and the second seam are disposed on opposite sides of the associated clamp structure axis.

7. The device of claim 4, wherein, in a second position of the mount structure, the first and second mount pieces are configured to release the clamp structures from the mount structure.

8. The device of claim 1, wherein each clamp structure includes a projection;
   wherein the mount structure includes cavities that receive the projections;
   wherein the projections and an inner surface of each cavity are configured to abut to limit movement of the associated clamp structure relative to the mount structure.

9. The device of claim 1, wherein each clamp structure includes a clamp abutment surface and the mount structure includes a plurality of mount abutment surfaces;
- wherein each clamp abutment surface is configured to abut the associated mount abutment surface to limit movement of the associated clamp structure relative to the mount structure; and
- wherein each clamp abutment surface is inversely contoured relative to the associated mount abutment surface.

10. The device of claim 1, wherein the mount structure includes a fastener aperture configured to receive a fastener to fixedly attach the mount structure to the area of the work machine.

* * * * *